Figure 3:
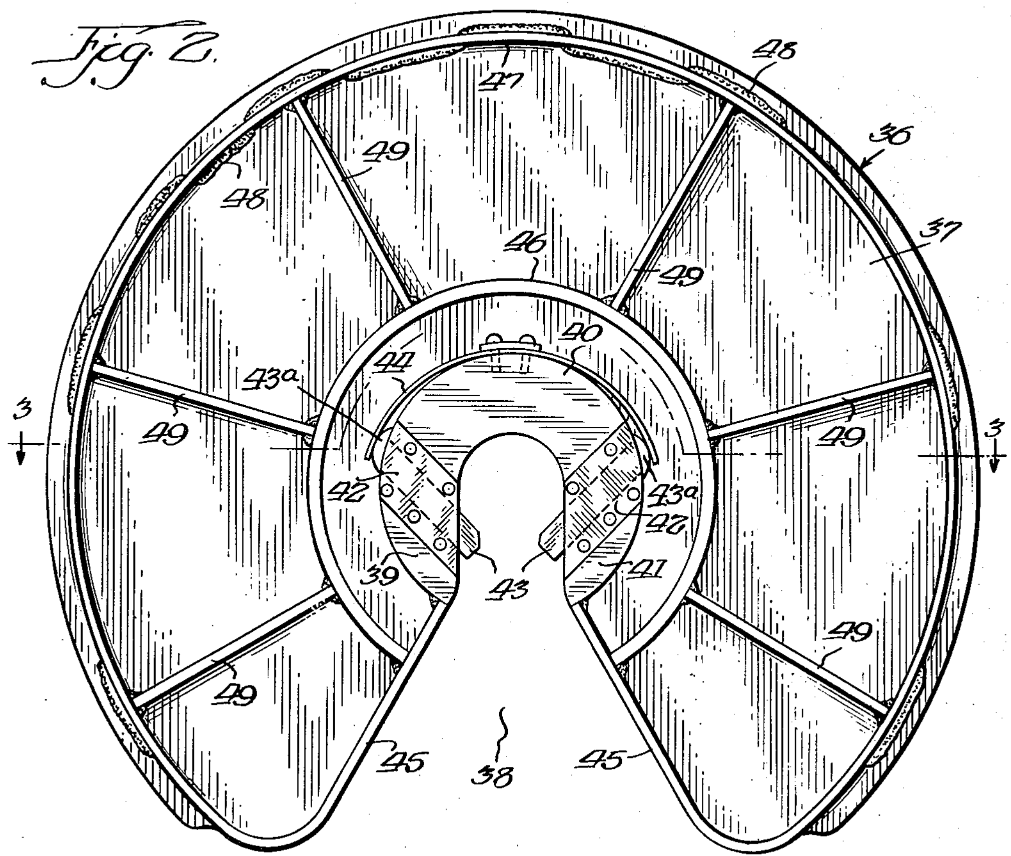

March 5, 1957 J. E. GUTRIDGE 2,783,899
TRANSFER TABLE FOR LOADING TRAILERS ON FLAT CARS
Filed Aug. 17, 1953 2 Sheets-Sheet 1
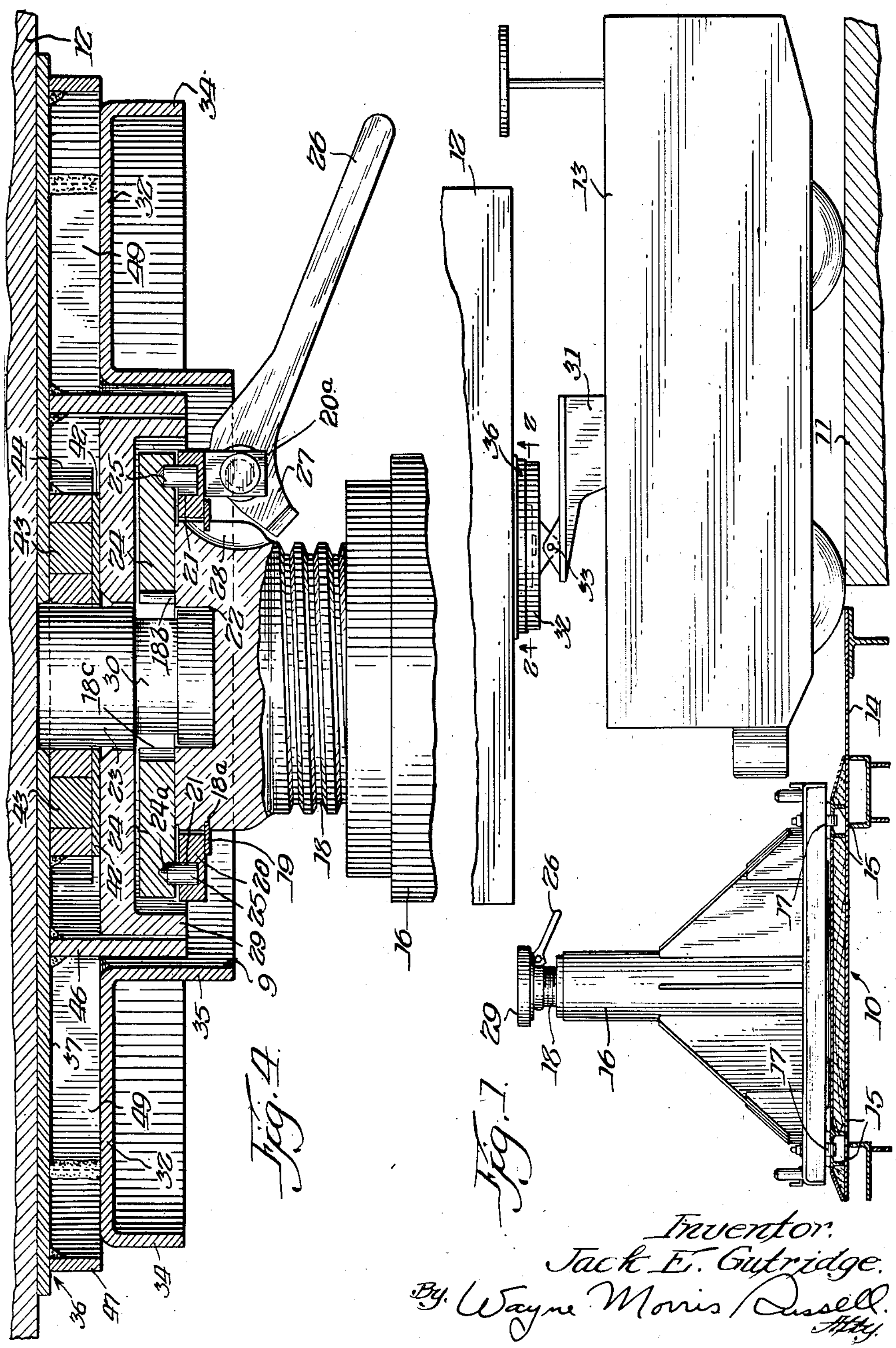

March 5, 1957 J. E. GUTRIDGE 2,783,899

TRANSFER TABLE FOR LOADING TRAILERS ON FLAT CARS

Filed Aug. 17, 1953 2 Sheets-Sheet 2

37
36
47
44
46

Inventor.
Jack E. Gutridge.
By. Wayne Morris Russell.
Atty.

2,783,899
Patented Mar. 5, 1957

2,783,899

TRANSFER TABLE FOR LOADING TRAILERS ON FLAT CARS

Jack E. Gutridge, Munster, Ind., assignor to Pullman-Standard Car Manufacturing Company, Chicago, Ill., a corporation of Delaware Application August 17, 1953, Serial No. 374,775

8 Claims. (Cl. 214—38)

This invention relates to the loading of vehicles on freight vehicles and is primarily concerned with a lift truck table for loading truck trailers on railway flat cars.

The principal object of the invention is to provide a lift truck table for loading truck trailers on railway flat cars.

An important object of the invention is to provide a lift truck table of such shape as to assure quick engagement between the table and the fifth wheel pin of a trailer.

Another object of the invention is to provide a means of holding the trailer fifth wheel pin in engagement with the lift truck table.

A further object of the invention is to provide a novel method of loading truck trailers on freight vehicles.

A further object of the invention is to provide a free table adapted to be mounted on a lift truck to assist in the loading of a trailer on a freight vehicle and which is deposited on the vehicle with the trailer and remains on the vehicle during the shipment of the trailers.

A more specific object of the invention is to provide a table including a plate provided with a notch and guide plates along the walls of the notch and secured to the plate and a circular flange secured to the plate and terminating at the guide plates and another circular flange spaced from the first named flange and terminating at the guide plates and radially spaced web plates extending between and secured to the flanges.

The foregoing and other objects of the invention are attained by the construction and arrangement illustrated in the accompanying drawings wherein:

Figure 1 is an elevational view showing a railway flat car alongside a platform at a railroad terminal with a fifth wheel stand mounted on the car and a lift truck on the platform loading a truck trailer on the car, Figure 2 is a bottom plan view of the transfer plate of the present invention, Figure 3 is a cross sectional view taken on the line 3—3 of Figure 2, and Figure 4 is a cross sectional view through the top portion of the fifth wheel stand and a plate connected to the lift truck and the transfer plate with the trailer fifth wheel pin seated in the top of the stand and extending through both plates and with the trailer bottom bearing upon the transfer plate.

The invention proposes a transfer table for loading truck trailers on railway flat cars. A lift truck has an elevator and a plate is connected to the elevator. The plate has a notch and a flange around the notch. The table has a notch and a circular flange is secured to the table and terminates at opposite walls of the notch. The table is adapted to be disposed on the plate on the lift truck so that the circular flange on the table is within the flange around the notch of the plate. The lift truck is moved under a truck trailer so that the walls of the notch in the table are guided around the fifth wheel pin on the trailer. The lift truck then lifts the front end of the trailer and sets the fifth wheel pin in a recess in the circular top of a vertically disposed stand mounted on the floor of the flat car and the circular flange of the table encircles the top of the stand. The elevator on the lift truck is lowered until the plate clears the table and the lift truck and its plate move off the flat car. The table remains on the stand on the flat car during the shipment of the trailer.

In the drawings, 10 generally designates a freight vehicle or railway flat car which is parked alongside a platform 11 at a railroad terminal. A vehicle or truck trailer 12 is delivered to the terminal by a truck tractor and is parked on the platform 11 ready to be loaded on the car by a lift truck 13 positioned on the platform. The flat car 10 is adapted to carry two trailers 12. The trailer 12 is of the type that has eight rear wheels, that is, a first pair of wheels disposed in front of a second pair of wheels at each side of the trailer. The trailer 12 has dolly wheels adjacent its front end and these wheels are adapted to support the front end. The flat car 10 as shown, has a metal floor 14 and a pair of slightly spaced T-shaped rails 15 are positioned longitudinally of the car and are secured to the floor. Another pair of slightly spaced T-shaped rails 15 are positioned longitudinally of the car and are spaced from the first named pair of rails 15 and are secured to the floor 14. A wood filler is disposed between the two pairs of rails 15 and a metal plate is disposed on the wood filler and extends between the pairs of rails and is secured to the adjacent rail at each side. A ramp plate extends from one of the rails 15 of each pair to the floor 14 and is secured to the rail and the floor. A vertically disposed fifth wheel stand 16 has a first pair of wheels arranged one in front of the other and mounted on the stand and adapted to roll on one pair of rails 15 and a second pair of wheels arranged one in front of the other and mounted on the stand and adapted to roll on the other pair of rails 15. Each wheel on the stand 16 has a rib 17 extending therearound intermediate its ends and the rib is adapted to project between the adjacent pair of rails 15 while the remainder of the wheel rolls on top of the rails. Since the wheels on the stand 16 roll on the rails the stand is movable longitudinally of the flat car 10.

The fifth wheel stand 16 has a vertically disposed jack screw 18 which is mounted in an internally threaded sleeve in the top of the stand. The top portion of the screw 18 has a smooth periphery which is free from threads and a groove **18*a* extends around the smooth periphery and a snap ring 19 is disposed in the groove. A locking ring 20 is positioned on the top portion of the screw 18 and seats on the snap ring 19 and is rotatable on the screw. A plurality of spaced slots 21 are provided in the locking ring 20 and these slots extend diagonally of the ring. That is to say, the longitudinal axes of the slots lie along lines that are related to the circumference of the locking ring 20 as chords. The top of the screw 18 has a recess 22 in the center thereof adapted to receive a fifth wheel pin 23 projecting from the bottom of the trailer 12 adjacent its front end. The top of the screw 18 also has a plurality of radially spaced grooves 18*b* therein extending from the periphery of the screw to the recess 22 and bosses 18*c* are left between and define the spacing of the grooves. A locking dog 24 is positioned in each groove 18*b* and a pin 25 is pressed into a recess 24*a* adjacent the outer end of each dog 24 and each pin is adapted to project into one of the slots 21. A pair of depending metal pieces 20*a*, one of which appears in Fig. 4, are welded to the locking ring 20 and a handle 26 is disposed between the metal pieces and a pin extends through the metal pieces and the handle to pivotally connect the handle to the ring. The handle 26 has a bladed extension 27 which is adapted to project into a depression 28 in the top portion of the screw 18. A circular guide plate 29 has a flange extending therearound and has an opening in its center. The guide plate 29 is adapted to be positioned on the bosses on top of the screw 18 and machine screws extend through the plate and into the bosses. By moving the handle 26 toward the screw 18 the extension 27 moves into the depression 28 and movement of the handle around the stand 16 will cause the screw to move upwardly or downwardly so that the stand is vertically adjustable according to the height of the bottom of the trailer 12 at the fifth wheel pin 23. The handle 26 may be pulled away from the screw 18 so that the extension 27 moves out of the depression 28. The handle 26 may then be moved around the screw 18 to cause rotation of the locking ring 20 and since the pins 25 must ride in the "diagonal" slots 21 in the locking ring the dogs 24 will move inwardly into a groove 30 in the fifth wheel pin 23 if the handle is moved around the screw in one direction and will move outwardly toward the periphery of screw 18 if the handle is moved in the opposite direction. The entering of the dogs 24 in the groove 30 in the fifth wheel pin 23 serves to hold the fifth wheel pin in the stand 16 and the guide plate 29 prevents vertical movement of the dogs when the dogs are in the groove in the fifth wheel pin. The guide plate 29 also prevents escape of the dogs 24 from their respective grooves when the locking ring 20** is rotated.

The lift truck 13 is of a special type which is movable both longitudinally and transversely of itself. Reference is made to applicant's copending application Serial No. 380,766, filed September 17, 1953, for an example of a lift truck of this type. The lift truck 13 has a front opening providing access to a pair of spaced vertically disposed tracks (not shown) having guideways (not shown) and an elevator 31 is slidably mounted in the guideways for upward or downward movement with respect to the lift truck. The lift truck 13 is driven by an electric motor which is operatively connected to the elevator 31 to provide for vertical movement of the elevator. A plate 32 is pivotally connected as at 33 to the elevator 31. The plate 32 has a circular opening therein and the edge of the plate has a notch 9 which extends inwardly to the opening. The entire bounding edge of the plate 32 has an integral flange 34 and an integral flange 35 extends around the opening and along the walls of the notch, all as best shown in Figure 4.

A transfer table 36 best illustrated in Figure 2 is adapted to be placed on the lift truck 13 to load the trailer 12 on the flat car 10 and when the trailer is placed on the fifth wheel stand 16 the table remains on the stand during the shipment of the trailer. The table 36 is made up of a circular plate 37 having a generally V-shaped open notch 38 extending inwardly from the edge of the plate to the center of the plate. Three spaced blocks 39, 40, and 41 are positioned around the portion of the notch 38 at the center of the plate 37 and are welded to the plate and these blocks are so formed that taken together they form a disk of U-shape. Adjacent edges of the blocks 39 and 40 are cut away to form a recess in each block and a plate 42 is disposed in the recesses in the blocks flush with the exposed faces of the blocks and screws extend through the plate into the blocks to secure the plate to the blocks. Adjacent edges of the blocks 40 and 41 are cut away and another plate 42 is secured to the blocks in a manner similar to the first named plate 42 and blocks 39 and 40. A pin 43 of rectangular shape in cross section is positioned in the opening formed by blocks 39 and 40 and the adjacent plate 42. An identical pin 43 is disposed in the opening formed by blocks 40 and 41 and the adjacent plate 42. Each pin 43 has its head 43*a* located in a plane which is at an angle less than 90° with respect to a plane through the shank of the pin. That is to say, the head of each pin, which of course constitutes an enlargement of the shank, keeping the pin from passing entirely through the opening in which the pin rides, is disposed obliquely relatively to the shank, instead of in the usual right-angular relationship. The head of each pin 43 is disposed at this angle so as to conform to the curvature of the blocks 39, 40, and the adjacent plate 42 or the blocks 40 and 41 and the adjacent plate 42. A leaf spring 44 is secured midway of its length to the block 40 by screws which extend through a small block and the spring and into the block 40. The ends of the spring 44 engage the heads of the pins 43 to urge the pins into the notch 38. A pair of guide plates 45 are positioned along the opposite walls of the notch 38 and both plates are welded to the plate 37 and one end of one plate is welded to the block 39 and one end of the other plate is welded to the block 41. A circular flange 46 is spaced from the blocks 39, 40, and 41, pins 43, and spring 44 and is welded to the plate 37 and the ends of the flange terminate at the guide plates 45 and are welded to the guide plates. Another circular flange 47 is spaced from the flange 46 and is spaced slightly from the periphery of the plate 37 and is welded to the plate by welds 48 on opposite faces of the flange. The ends of the flange 47 terminate at the guide plates 45 and are welded to the guide curved ends of the guide plates. A plurality of radially directed ribs 49 are circumferentially spaced around the flange 46 and extend between the flange 46 and the flange 47 and one end of each web plate is welded to the flange 46 and the other end of each web plate is welded to the flange 47.

Assuming that the trailer 12 is parked on the platform 11 with its dolly wheels supporting its front end and the lift truck 13 is disposed on the same platform, the operator places the transfer table 36 on the plate 32 so that the notches in the plates 37 and 32 are disposed one over the other with the flange 46 on the table within the flange 35 on the plate 32 and the web plates 49 on the table bearing upon the top face of the plate 32. The operator then moves the elevator 31 on the lift truck 13 vertically until the top face of the table 36 is of the same height as the bottom of the trailer 12 at the fifth wheel pin 23. The operator then moves the lift truck 13 under the trailer 12 so that the walls of the notch 38 in the plate 37 are guided around the fifth wheel pin 23. Continued movement of the lift truck 13 under the trailer 12 will cause the pins 43 to engage the fifth wheel pin 23 and the pins will be forced out of the notch 38 against the force of the spring 44 and as soon as the pins move past the fifth wheel pin they will be moved back into the notch by the spring. As soon as the pins 43 clear the fifth wheel pin 23 the fifth wheel pin will be at the end of the notch 38 at the center of the plate 37. The lift truck 13 then backs the rear end of the trailer 12 onto the flat car 10 so that the four rear wheels at one side of the trailer are directed onto a turntable (not shown) pivotally mounted at its center to the floor of the flat car. The lift truck 13 then moves the front end of the trailer 12 onto the flat car 10 with the four rear wheels above mentioned pivoting with the turntable (not shown) while the other four rear wheels at the other side of the trailer roll on the floor of the flat car. The lift truck 13 then backs the trailer 12 longitudinally of the flat car 10 until the rear end of the trailer engages a holding device (not shown) mounted on the floor of the flat car. The fifth wheel stand 16 is then moved longitudinally of the flat car 10 on the rails 15 until the recess 22 in the screw 18 is directly under the fifth wheel pin 23 on the trailer 12. The elevator 31 on the lift truck 13 is then lowered so that the fifth wheel pin 23 on the trailer 12 seats in the recess 22 in the fifth wheel stand 16. When the front end of the trailer 12 is lowered the blocks 39, 40, and 41 and plates 42 seat on the circular guide plate 29 and the circular flange 46 on the table 36 encircles the guide plate as best shown in Figure 4. The elevator 31 on the lift truck 13 is then lowered until the top surface of the plate 32 is below the flange 46 on the table 36. The notch 9 and opening in the plate 32 are larger than the top portion of the stand 16 so that the plate can be moved horizontally away from the stand to move the stand out of the opening and the notch. The lift truck 13 with the plate 32 is then backed away from the stand 16 until it is off the flat car 10 and on the platform 11. The table 36 remains on the stand 16 during the shipment of the trailer 12. When the trailer 12 reaches its destination and is ready to be unloaded from the flat car 10 a lift truck 13 with only an elevator 31 and a plate 32 will move onto the car. The elevator 31 on the lift truck 13 is then lowered until the top surface of the plate 32 is below the flange 46 on table 36. The lift truck 13 will be moved transversely of the flat car 10 so that the walls of the notch and the opening in plate 32 will be guided around the top portion of the stand 16. The elevator 31 on the lift truck 13 will then be raised until the top surface of the plate 32 contacts the web plates 49 on table 36. Continued upward movement of the elevator 31 on the lift truck 13 will raise the front end of the trailer 12 so that it clears the stand 16 and the fifth wheel pin 23 will be raised out of the recess 22 in the stand. As soon as the fifth wheel pin 23, plate 32 and table 36 clear the stand 16 the lift truck 13 moves the trailer 12 longitudinally forward of the flat car to disengage the rear end of the trailer from the holding device. The lift truck 13 then moves the front end of the trailer 12 off the flat car with the same four rear wheels pivoting on the turntable and the other four rear wheels rolling on the floor of the car. The lift truck 13 then moves the trailer 12 off the flat car 10. It is to be noted that the table 36 has been removed from the stand 16 and is on the lift truck 13 on the plate 32.

The advantage of the notch 38 in the plate 37 is that the walls of the notch may be easily guided around the fifth wheel pin 23 assuring quick engagement between the plate and the pin. If a plate was used which had only an opening in its center it would be necessary for the operator of the lift truck to index the opening with the fifth wheel pin entirely by sight and possibly have to move the lift truck and raise the elevator a number of times before finally succeeding in getting the fifth wheel pin in the opening in the plate.

From the foregoing it will be seen that there has been provided a transfer table which can be freely disposed on an elevator type lift truck and can be quickly engaged with the fifth wheel pin of a trailer and greatly simplifies the loading of trailers on flat cars.

What is claimed is:

1. An article for loading a vehicle onto a freight vehicle comprising a plate provided with a notch, guide plates positioned along the opposite walls of the notch and secured to the plate, a first circular flange secured to the plate and terminating at the guide plates, a second circular flange spaced from the first flange and secured to the plate and terminating at the guide plates, and a plurality of spaced web plates extending between the first and second flanges and secured to the flanges.

2. Apparatus for loading a truck trailer having a fifth wheel pin onto a freight vehicle having a stand by means of a lift truck, comprising a plate mounted on the lift truck, and another plate having substantially the same size as the first-named plate disposed on the first-named plate and provided with an opening, the lift truck being adapted to be moved under the trailer so that the opening in the second-named plate receives the fifth wheel pin and being adapted to move the trailer onto the freight vehicle so that the fifth wheel pin engages the stand.

3. Apparatus for loading a truck trailer having a fifth wheel pin onto a freight vehicle having a stand by means of a lift truck, comprising a plate provided with an opening therein and mounted on the lift truck, and another plate provided with an opening and a flange secured to the plate and the second-named plate being disposed on the first-named plate with the flange on the second-named plate being disposed in the opening in the first-named plate, the lift truck being adapted to be moved under the trailer so that the opening in the second-named plate receives the fifth wheel pin and being adapted to move the trailer onto the freight vehicle so that the fifth wheel pin engages the stand and being adapted to move itself and the first-named plate off the freight vehicle.

4. Apparatus for loading a truck trailer having a fifth wheel pin onto a freight vehicle having a stand provided by means of an opening with a lift truck, comprising a plate provided with an opening therein and a notch extending inwardly from the edge of the plate to the opening and the plate being mounted on the lift truck, and another plate provided with a notch and a circular flange secured to the plate and terminating at the notch and the flange having a diameter less than the size of the opening in the first-named plate and the second-named plate being disposed on the first-named plate with the flange on the second-named plate being disposed in the opening in the first-named plate, the lift truck being adapted to be moved under the trailer so that the walls of the notch on the second-named plate are guided around the fifth wheel pin and being adapted to move the trailer onto the freight vehicle so that the fifth wheel pin enters the opening in the stand and being adapted to move itself and the first-named plate off the freight vehicle.

5. Apparatus for loading a truck trailer having a fifth wheel pin onto a freight vehicle having a vertically disposed stand including a top provided with an opening by means of a lift truck, comprising a plate provided with a circular opening therein and a notch extending inwardly from the edge of the plate to the opening and a flange extending around the opening and along the notch and the plate being pivotally mounted on the lift truck, another plate provided with a notch and a circular flange secured to the plate and terminating at the notch and the flange having a diameter less than the diameter of the opening in the first-named plate, and spacing means on the second-named plate, the second-named plate being disposed on the first-named plate with the flange on the second-named plate being disposed in the opening in the first-named plate and the spacing means bearing upon the first-named plate to space the second-named plate from the first-named plate, the lift truck being adapted to be moved under the trailer so that the walls of the notch on the second-named plate are guided around the fifth wheel pin and being adapted to move the trailer onto the freight vehicle so that the fifth wheel pin enters the opening in the top of the stand and the flange on the second-named plate encircles the top of the stand and being adapted to move itself and the first-named plate off the freight vehicle.

6. Apparatus for loading a truck trailer having a fifth wheel pin onto a freight vehicle having a vertical trailer support stand by means of a lift truck, comprising a first plate vertically movable on the lift truck having an open slot extending from its margin with a closed end about a central point of the plate, said slot being of sufficient width to pass the upper portion of the stand upon relative horizontal movement of the plate and stand, a second plate having an open slot extending from its margin with a closed end about a central point of the second plate, said second plate slot being of sufficient width to receive said fifth wheel pin upon relative horizontal movement of said second plate and said pin and the closed end being adapted for close engagement with said pin, means on said second plate for latching thereof on said pin upon engagement of the pin in the closed end of said slot, and interengaging means on said plates effecting vertical alignment of said central points and substantially preventing relative horizontal movement of the plates upon superimposition of said second plate on said first plate.

7. Apparatus for loading a truck trailer having a fifth wheel pin onto a freight vehicle having a vertical trailer support stand by means of a lift truck, comprising a first plate vertically movable on the lift truck having an open slot extending from its margin with a closed end about a central point of the plate, said slot being of sufficient width to pass the upper portion of the stand upon relative horizontal movement of the plate and stand, a second plate having an open slot extending from its margin with a closed end about a central point of the second plate and a flange secured to the plate and the second plate being disposed on the first plate with the flange projecting into the closed end portion of the slot in the first plate to effect vertical alignment of said central points and substantially prevent relative horizontal movement of the plates, said second plate slot being of sufficient width to receive said fifth wheel pin upon relative horizontal movement of said second plate and said pin and the closed end being adapted for close engagement with said pin, and means on said second plate for latching thereof on said pin upon engagement of the pin in the closed end of said slot.

8. The method of locating a fifth wheel pin of a truck trailer in an opening in a stand on a freight vehicle with a plate provided with a notch and a plate having a notch and a flange secured thereto, comprising the steps of placing the second-named plate on the first-named plate so that the flange on the second-named plate is within the notch in the first-named plate, moving the plates under the trailer so that the walls of the notch in the second-named plate are guided around the fifth wheel pin, moving the plates and the trailer onto the freight vehicle and centering the plates over the stand, lowering the plate so that the fifth wheel pin enters the opening in the stand, then continuing lowering of the first-named plate for release from the second-named plate, moving the first-named plate substantially horizontally from the stand after said release from the second-named plate, and moving the first-named plate off the freight vehicle.

References Cited in the file of this patent

UNITED STATES PATENTS

| | | |
|---|---|---|
| 1,260,027 | Peets et al. | Mar. 19, 1918 |
| 1,870,502 | Fuhrman | Aug. 9, 1932 |
| 1,951,258 | Retzlaff et al. | Mar. 13, 1934 |
| 1,968,196 | Francis | July 31, 1934 |
| 2,096,282 | Kortering | Oct. 19, 1937 |
| 2,102,821 | Seyferth | Dec. 21, 1937 |
| 2,362,991 | Dahl | Nov. 21, 1944 |
| 2,456,826 | Fontaine et al. | Dec. 21, 1948 |
| 2,491,824 | McKee | Dec. 20, 1949 |
| 2,513,117 | Stephen | June 27, 1950 |
| 2,567,312 | Apgar | Sept. 11, 1951 |
| 2,637,453 | Cleveland | May 5, 1953 |

FOREIGN PATENTS

| | | |
|---|---|---|
| 111,071 | Australia | July 16, 1940 |